United States Patent
Van De Poel et al.

(10) Patent No.: US 10,229,207 B2
(45) Date of Patent: Mar. 12, 2019

(54) SOLUTION FOR DISTRIBUTED APPLICATION LIFE-CYCLE MANAGEMENT

(71) Applicant: THOMSON LICENSING, Issy de Moulineaux (FR)

(72) Inventors: Dirk Van De Poel, Aartselaar (BE); Patrick Goemaere, Brecht (BE); Kurt Jonckheer, Antwerp (BE)

(73) Assignee: Thomson Licensing, Cesson-Sevgne (FR)

( * ) Notice: Subject to any disclaimer, the term of this patent is extended or adjusted under 35 U.S.C. 154(b) by 187 days.

(21) Appl. No.: 14/433,871

(22) PCT Filed: Sep. 30, 2013

(86) PCT No.: PCT/EP2013/070364
§ 371 (c)(1),
(2) Date: Apr. 7, 2015

(87) PCT Pub. No.: WO2014/056750
PCT Pub. Date: Apr. 17, 2014

(65) Prior Publication Data
US 2015/0278374 A1    Oct. 1, 2015

(30) Foreign Application Priority Data
Oct. 11, 2012 (EP) .................................... 12306242

(51) Int. Cl.
*G06F 17/30* (2006.01)
*G06F 8/61* (2018.01)
(Continued)

(52) U.S. Cl.
CPC .......... *G06F 17/30867* (2013.01); *G06F 8/61* (2013.01); *G06F 8/65* (2013.01); *H04L 67/10* (2013.01)

(58) Field of Classification Search
CPC .................................................. G06Q 30/0631
(Continued)

(56) References Cited

U.S. PATENT DOCUMENTS 7,437,706 B2   10/2008  Woodgeard
7,735,080 B2    6/2010  Barturen et al.
(Continued)

FOREIGN PATENT DOCUMENTS

CN    101859425    10/2010
CN    101959179     1/2011
(Continued)

OTHER PUBLICATIONS

Anonymous: The Broadband Forum; "TR-069 Amendment 3"; ;TR-069 CPE WAN Management Protocol; Issue 1, Nov. 2010, Protocol Version 1.2, pp. 1-197.
(Continued)

*Primary Examiner* — Baoquoc N To
(74) *Attorney, Agent, or Firm* — Vincent E. Duffy

(57) ABSTRACT

A solution for managing applications in a network is proposed. A distributed application management system receives information about a first application installed on a first device in the network and determines whether a second application is required or recommended for the first device or for a second device in the network or whether a further device is required or recommended for the network based on the received information. A device management system then informs a user about a required or recommended second application or a required or recommended further device.

10 Claims, 2 Drawing Sheets

(51) Int. Cl.
*G06F 8/65* (2018.01)
*H04L 29/08* (2006.01)

(58) Field of Classification Search
USPC ................ 707/638, 628; 705/26.7; 726/7
See application file for complete search history.

(56) References Cited

U.S. PATENT DOCUMENTS

| | | | |
|---|---|---|---|
| 2001/0053691 A1* | 12/2001 | Harma | A63F 13/12 455/419 |
| 2002/0042833 A1* | 4/2002 | Hendler | H04L 29/06027 709/231 |
| 2003/0046681 A1 | 3/2003 | Barturen et al. | |
| 2008/0262860 A1* | 10/2008 | Schneider | G06Q 10/10 705/1.1 |
| 2010/0146442 A1 | 6/2010 | Nagasaka et al. | |
| 2010/0205274 A1 | 8/2010 | Gharabally et al. | |
| 2011/0040826 A1* | 2/2011 | Chadzelek | H04L 67/02 709/203 |
| 2011/0202915 A1 | 8/2011 | Kuroyanagi | |
| 2012/0066675 A1* | 3/2012 | Shelansky | G06F 9/44526 717/178 |
| 2012/0110568 A1* | 5/2012 | Abel | G06F 8/61 717/178 |
| 2012/0123898 A1 | 5/2012 | Kirkeby et al. | |
| 2012/0309464 A1* | 12/2012 | Lim | H04M 1/72522 455/566 |
| 2013/0030954 A1 | 1/2013 | Liu et al. | |
| 2013/0042230 A1* | 2/2013 | Little | G06F 8/65 717/173 |
| 2013/0054801 A1* | 2/2013 | Belchee | G06F 21/105 709/225 |
| 2013/0085886 A1* | 4/2013 | Satish | G06Q 30/02 705/26.7 |
| 2013/0124693 A1* | 5/2013 | Kato | G06F 9/445 709/219 |
| 2013/0132937 A1* | 5/2013 | Sung | G06F 8/61 717/172 |
| 2013/0297317 A1* | 11/2013 | Lee | H04M 1/72552 704/270.1 |
| 2013/0325573 A1* | 12/2013 | Park | G06Q 30/0241 705/14.16 |
| 2013/0326449 A1* | 12/2013 | Iyer | G06F 17/5031 716/114 |
| 2014/0006434 A1* | 1/2014 | Chervirala | G06Q 30/02 707/758 |
| 2014/0047458 A1 | 2/2014 | Li et al. | |
| 2014/0052683 A1* | 2/2014 | Kirkham | G06Q 30/0631 706/46 |
| 2014/0162595 A1* | 6/2014 | Raleigh | H04L 67/22 455/405 |
| 2014/0344254 A1 | 11/2014 | Pu et al. | |
| 2015/0244581 A1* | 8/2015 | Angaluri | H04L 41/0823 709/224 |
| 2015/0373107 A1* | 12/2015 | Chan | H04W 4/003 709/205 |

FOREIGN PATENT DOCUMENTS

| | | |
|---|---|---|
| CN | 102111749 | 6/2011 |
| CN | 102195964 | 9/2011 |
| CN | 102541590 | 7/2012 |
| CN | 102722379 | 10/2012 |
| EP | 1724682 | 11/2006 |
| EP | 2184904 | 5/2010 |
| JP | 2010157207 | 7/2010 |
| WO | WO2009109980 | 9/2009 |
| WO | WO2011135629 | 11/2011 |
| WO | WO2012056324 | 5/2012 |

OTHER PUBLICATIONS

Search Report dated Oct. 22, 2013.
Yamaguchi_To-Easily-Master-Package-Management dated May 8, 2006.

* cited by examiner

SOLUTION FOR DISTRIBUTED APPLICATION LIFE-CYCLE MANAGEMENT

This application claims the benefit, under 35 U.S.C. § 365 of International Application PCT/EP2013/070364, filed Sep. 30, 2013, which was published in accordance with PCT Article 21(2) on Apr. 17, 2014 in English and which claims the benefit of European patent application No. 12306242.4, filed Oct. 11, 2012.

FIELD OF THE INVENTION

The invention relates to a solution for a distributed application life-cycle management, and more specifically to a solution for a distributed application life-cycle management, which is capable of handling interrelated distributed applications on multiple devices.

BACKGROUND OF THE INVENTION

Today, not only traditional personal computers and mobile devices, such as smartphones and tablets, support dynamic installation of applications. Also devices under NSP management (NSP: Network Service Provider), such as broadband gateways and set top boxes, support application life-cycle management, i.e. the process of dynamically (at any point in time) installing, updating and uninstalling applications.

As an example, the Broadband Forum TR-069 CPE WAN Management Protocol (TR-069 Amendment 3 or later) defines a protocol that allows a so-called ACS (ACS: Auto Configuration Server) to dynamically install applications, also referred to as software components, on a CPE device (CPE: Customer Premises Equipment), such as a gateway, a router or a set top box.

European patent application EP 2 184 904 describes a state of the art TR-069 system for performing application life-cycle management on the same device while keeping track of cross-execution environment dependencies, e.g. OSGi (OSGi: Open Services Gateway initiative) and native Linux, as well as service subscription and configuration of needed applications.

With the spread of more popular smartphones and tablets people are becoming aware of the so-called application stores and get familiar with searching for and installing applications on these devices. However, people are less aware and familiar with the fact that also other devices may support dynamic installation of components.

In addition, there is a trend towards ever more network connected devices and a number of services come with applications for phone or tablet.

Furthermore, multi-screen applications and services are becoming increasingly popular, whereby, for example, video content displayed on a TV is supported by tablet applications providing additional information. Such solutions often depend on a set of applications running on multiple devices, so called "distributed applications".

SUMMARY OF THE INVENTION

It is an object of the present invention to propose a method and an apparatus for a distributed application life-cycle management, which are capable of handling interrelated distributed applications on multiple devices.

According to one aspect of the invention, a method for managing applications in a network comprises the steps of:

receiving information about a first application installed on a first device in the network;
determining whether a second application is required or recommended for the first device or for a second device in the network or whether a further device is required or recommended for the network based on the received information; and
informing a user about a required or recommended second application or a required or recommended further device.

Accordingly, an apparatus for managing applications in a network comprises:

an input for receiving information about a first application installed on a first device in the network;
a distributed application management system for determining whether a second application is required or recommended for the first device or for a second device in the network or whether a further device is required or recommended for the network based on the received information; and
an device management system for informing a user about a required or recommended second application or a required or recommended further device.

According to a further aspect of the invention, a method for managing applications on a device in a network comprises the steps of:

installing or updating a first application on the device;
sending information about the first application to a distributed application management system; and
receiving information about a required or recommended second application or a required or recommended further device from the distributed application management system.

Accordingly, a network device capable of managing applications is adapted to perform the steps of:

installing or updating a first application;
sending information about the first application to a distributed application management system; and
receiving information about a required or recommended second application or a required or recommended further device from the distributed application management system.

The present invention defines a high level distributed application backend or cloud system, to which the network devices connect. The system leverages on the different existing dedicated solutions for application life-cycle management for various devices, either under NSP remote management or not. It contains dependency information on distributed applications and the devices they can be running on. After receiving information about a first application, e.g. upon installation of the application or upon updating of the application, the system determines whether any depending upon applications are missing or if new devices or additional applications should be recommended for a better user experience. Possibly, direct links to device resellers are provided along with the recommendation for one-click purchase.

The proposed solution allows to overcome a number of issues. Users may not be aware of the availability of applications for given devices, which leads to a sub-optimal user experience because of missing parts of the distributed application. Also, while users may be familiar with installing applications on today's most popular devices, such as smartphones or tablets, they may not be familiar with installing applications on other home network devices. For some devices without user interface, the applications running on them may be invisible to the end-user while providing functionality on which other applications depend. Furthermore, pairing different devices and applications may be a cumbersome process requiring end-user configuration of user passwords. Not all devices in the home are possibly under management using a protocol such as TR-069, which means that a NSP can automatically install some parts of the distributed application, but not all of them.

The solution according to the invention yields an optimal user experience for enabling a service. An end-user selects an user interface oriented application from an existing application store he or she is familiar with and is automatically informed about all needed or recommended applications. There is no need perform any individual steps of subscribing to a service and searching and installing all applications that are compatible with devices the end-user owns. This minimizes the risk of problems between incompatible applications and reduces the ever growing complexity of distributed applications caused by the increasing number of network connected devices.

As a further advantage, the proposed solution does not require new application stores for devices such as broadband gateways, but relies upon user interface centered applications as a main distribution channel. Devices such as broadband gateways have limited user interface capabilities, which would make it difficult for end-users to be aware of the functionality residing on the device.

Favorably, at least part of the received information is compared with entries in a database with dependency information for determining a required or recommended second application or a required or recommended further device. The database with dependency information comprises mandatory or recommended dependencies between applications and the devices they are running on as well as information on devices owned by a subscriber. The dependency information advantageously comprises application version ranges for mandatory (for service) or recommended (for optimal user experience) applications, device types on which these can run, and device resellers of devices a customer does not yet have but which would support applications that maximize the user experience.

Advantageously, at least required applications are automatically installed on the appropriate devices, within or outside of the home. During installation, the system preferably reports what the installation status is.

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims.

DETAILED DESCRIPTION OF PREFERRED EMBODIMENTS

Figure 1:
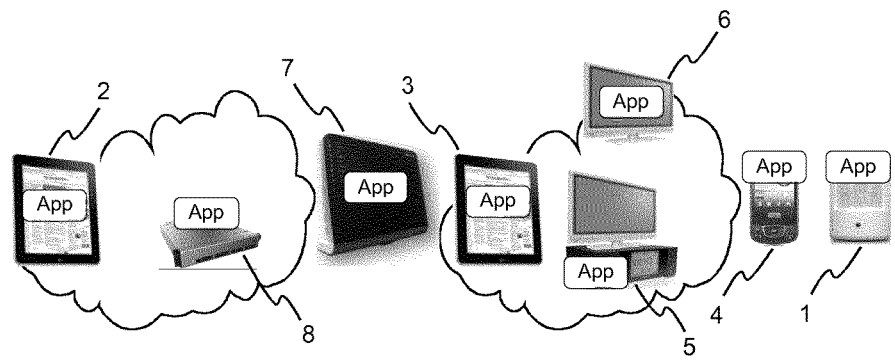
FIG. 1 shows an exemplary topology of distributed applications.

In FIG. 1 an exemplary topology of distributed applications, which are all part of a particular service is visualized. For example, the particular service may be related to home automation or media or content sharing. The topology includes an application on a home sensor 1, which is able to sense environmental conditions such as motion, temperature, humidity, air quality, or elements, etc. and to translate this into events and data. User interface applications are installed on tablets 2, 3 within or outside the house. Further user interface applications are installed on mobile phones 4 and on a set top box 5 or a smart TV 6. Additional applications are installed on a broadband gateway 7 or other network devices 8.

Figure 2:
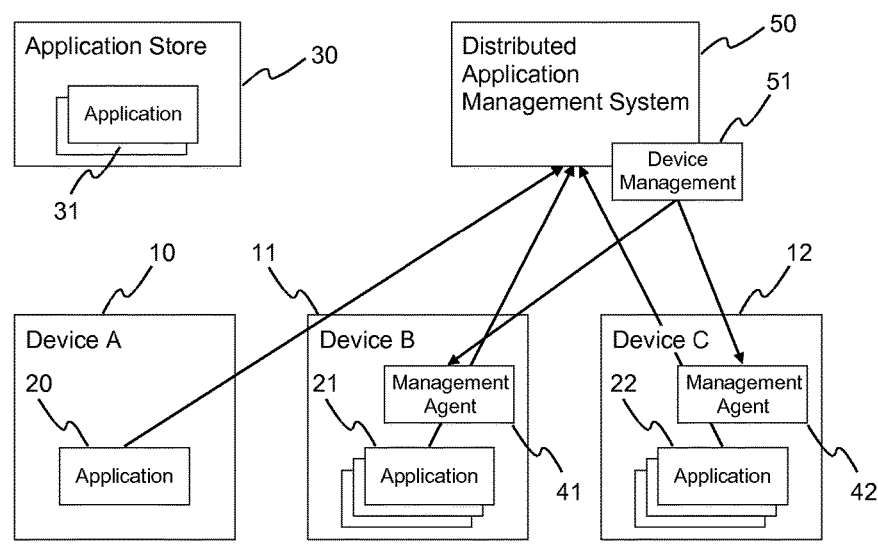
FIG. 2 depicts the components of a distributed application life-cycle management solution according to the invention.

FIG. 2 schematically illustrates the components that relate to the present invention. The devices 10, 11, 12 are network connected devices capable of running applications. Each device embeds at least one network interface, such as Ethernet, WiFi, mobile 3G/LTE (3G: 3rd generation of mobile telecommunications technology; LTE: Long Term Evolution), etc., and has a CPU (CPU: Central Processing Unit) as well as memory. Examples of such devices are tablets, smartphones, set top boxes, PCs (PC: Personal Computer), or broadband gateways, which are installed at customer premises and provide Internet access over Cable DOCSIS (DOCSIS: Data Over Cable Service Interface Specification), DSL (DSL: Digital Subscriber Line), mobile 3G/LTE, fiber, etc.

Running on the devices 10, 11, 12 are applications 20, 21, 22. An application 20, 21, 22 can be dynamically installed on a device 10, 11, 12 and executed/started. The installation can be done manually by an end-user of the device 10, 11, 12, e.g. by installing it from a storage medium such as a compact disc or alternatively from a so-called application store 30, where end-users can select from a plurality of applications 31 for installation on a device. Typically the application store 30 is available via the Internet. Installation can also be done automatically, e.g. under control of a network service provider in the context of subscribing to a service and the NSP remotely managing a number of service related devices. In case of distributed applications, an application will directly, e.g. using web services, or indirectly, e.g. via a cloud or backend platform which provides the infrastructure for communication or messaging between applications, interface with other applications. An example of such communication is a tablet application with a rich user interface, which interfaces with a backend application reachable via the Internet and also communicates with one or more applications running within the home, e.g. on a broadband gateway and on a power metering device or another device connecting sensors or home control to the Internet. The proposed solution does not depend on one particular communication infrastructure, possible examples include, but are not limited to, 'push notifications' for mobile devices (as offered by Google, Apple, RIM . . . ).

Devices 11, 12 that are under NSP control and remote management typically embed a remote management agent 41, 42. One example is a Broadband Forum TR-069 CPE WAN Management Protocol agent, another example is an OMA-Device Management agent (OMA: Open Mobile Alliance). Of course, also the leftmost device 10 may be under NSP control and remote management. The management agent 41, 42 typically connects to a device management system 51 using a standardized protocol, such as TR-069, OMA-DM, SNMP (SNMP: Simple Network Management Protocol), or a proprietary protocol enabling the device management system 51 to send remote management instructions, which are propagated and executed in the device 11, 12 as needed. One example of a management instruction is the installation of an application, as found in the TR-069 Amendment 3 specification.

All distributed applications connect to a distributed application management system (DAMS) 50. The DAMS holds all mandatory or recommended dependencies between applications and the devices they are running on. For this purpose it has information on the devices owned by subscribers. This information can be obtained by any suitable mechanism, for example the TR-069 CPE WAN Management Protocol in combination with the TR-098 or TR-181i2 data model for home network defined by Broadband Forum.

Exemplary information stored by the distributed application management system 50 advantageously comprises:
- Application information, with for each application:
  - Application identity (name, version, author)
  - Mandatory applications it depends on, with for each application:
    - Application identity (name, version, author)
    - Compatible version range (the versions the application is compatible with)
    - The devices the application can run on, with for each device:
      - Operating system
      - Operating system version range
      - Manufacturer
      - Hardware/product identifier
  - Mandatory devices, with for each device:
    - Manufacturer
    - Hardware/product identifier
    - Suppliers, with for each supplier:
      - Name
      - URL of Internet store web-site
      - Price
  - Recommended applications, with for each application:
    - Application identity (name, version, author)
    - Compatible version range (the versions the application is compatible with)
    - The devices the application can run on, with for each device:
      - Operating system
      - Operating system version range
      - Manufacturer
      - Hardware/product identifier
  - Recommended devices, with for each device:
    - Manufacturer
    - Hardware/product identifier
    - Suppliers, with for each supplier:
      - Name
      - URL of Internet store web-site
      - Price
- Subscriber information, with for each subscriber:
  - Subscriber identity (e.g. email address)
  - The list of subscriber owned devices, with for each device:
    - Device identity (serial number or IMEI (IMEI: International Mobile Equipment Identity))
    - Operating system
    - Operating system version
    - Manufacturer
    - Hardware/product identifier
    - IPv4 and/or IPv6 Address(es)
    - List of installed applications, with for each application:
      - Application identity (name, version, author)
  - Service subscriptions, with for each subscription:
    - Service name
    - Service validity date
    - Billing information (how billing is performed)

The device management system 51 communicates with the device management agents 41, 42 to perform application installation or uninstallation as determined by the distributed application management system 50. It may be part of or separate from the distributed application management system 50.

Figure 3:
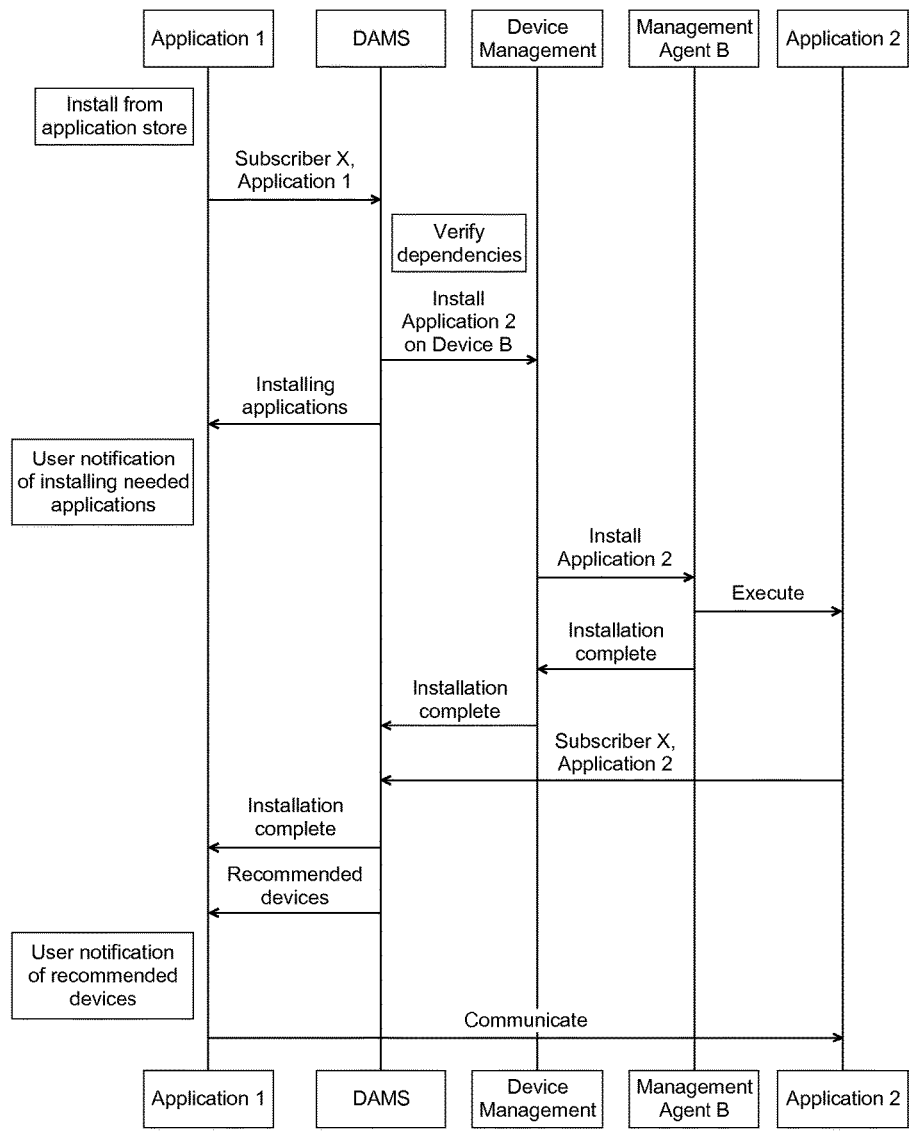
FIG. 3 illustrates an exemplary distributed application management procedure.

The flowchart in FIG. 3 illustrates an exemplary distributed application management procedure. In this example, installation of a first application (Application 1) automatically results in installation of a second application (Application 2) on another device.

In the example, a first application (Application 1) is installed from an application store 30 on a first device 10 (Device A) of a subscriber X. The first application notifies its installation and the necessary detailed information to the distributed application management system 50. The distributed application management system 50 verifies the available dependencies and instructs the device management 51 to initiate installation of a second application (Application 2) on a second device 11 (Device B) of the subscriber X. The device management 51 in turn instructs the management agent 41 of the second device 11 to install the second application. It further informs the first application about the installation of another application. The first application notifies the user accordingly. The installation instruction is executed by the management agent 41, which notifies the device management 51 once the installation of the second application is complete. The device management 51 in turn informs the distributed application management system 50 about completion of the installation. After installation, also the second application submits the necessary detailed information to the distributed application management system 50. The distributed application management system 50 inform the first application about completion of the installation and about potential recommended devices. The first application about in turn notifies the user about any recommended devices. Once the procedure is finished, the first application is able to communicate with the second application, if necessary.

The invention claimed is:

1. A method for managing applications in a network, the method comprising:
   receiving information about a first application installed on a first device being used by a user in the network;
   determining whether the first application is required or recommended on a further device of the user in the network based on the received information, based on dependency information in a database;
   automatically installing or updating the first application on the further device of the user if it is determined that the first application on the further device is required; and
   informing the user on the first device about the option of installing or updating the first application on the further device if it is determined that the first application is recommended on the further device of the user.

2. The method according to claim 1, wherein at least part of the received information is compared with entries in the database with dependency information for determining a required or recommended further device.

3. The method according to claim 2, wherein the database with dependency information comprises mandatory or recommended dependencies between applications and the devices they are running on as well as information on devices owned by a subscriber.

4. The method according to claim 1, wherein the information about the first application installed on the first device is received upon installation of the first application on the first device or upon updating of the first application.

5. A method for managing applications on a device in a network, the method comprising:

installing or updating a first application on the device in the network, the device being used by a user;

sending information about the first application to a distributed application management system; and receiving information at the first about whether the first application is required or recommended on a further device of the user in the network from the distributed application management system based on dependency information in a database, wherein the first application is automatically installed or updated on the further device if the first application is required on the further device and wherein the user of the device is notified of the option to install or update the first application on the further device of the user if the first application is recommended on the further device of the user.

6. An apparatus for managing applications in a network, the apparatus comprising:

an input configured to receive information about a first application installed on a first device in the network, the first device being used by a user;

a distributed application management system configured to determine whether a further device of the user in the network is required or recommended for the network based on the received information based on dependency information in a database; and a device management system configured automatically install or update the further device of the user with the first application if it is determined that the first application on the further device of the user is required, the device management system further configured to inform the user on the first device about the option of installing or updating the first application on the further device of the user if it is determined that the first application is recommended on the further device of the user.

7. The apparatus according to claim 6, wherein the distributed application management system is configured to compare at least part of the received information with entries in the database with dependency information for determining a required or recommended further device.

8. The apparatus according to claim 7, wherein the database with dependency information comprises mandatory or recommended dependencies between applications and the devices they are running on as well as information on devices owned by a subscriber.

9. The apparatus according to claim 6, wherein the information about the first application installed on the first device is received upon installation of the first application on the first device or upon updating of the first application.

10. A network device configured to manage applications, wherein the network device is configured to:

install or update a first application while the network device is being used in a network by a user;

send information about the first application to a distributed application management system; and receive information about whether the first application is required or recommended on a further device of the user in the network from the distributed application management system, the information determined based on a dependency in a database, wherein the first application is automatically installed or updated on the further device of the user if the first application is required on the further device of the user and wherein the user is notified on the network device of the option to install or update the first application on the further device of the user if the first application is recommended on the further device of the user.

* * * * *